United States Patent
Fornage

(10) Patent No.: US 10,003,194 B2
(45) Date of Patent: Jun. 19, 2018

(54) PARALLEL BATTERY SYSTEM

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 192 days.

(21) Appl. No.: 14/921,241

(22) Filed: Oct. 23, 2015

(65) Prior Publication Data

US 2016/0118789 A1    Apr. 28, 2016

Related U.S. Application Data

(60) Provisional application No. 62/068,227, filed on Oct. 24, 2014.

(51) Int. Cl.
*H02J 3/00* (2006.01)
*H02M 7/44* (2006.01)
*H02J 3/38* (2006.01)
*H02J 7/00* (2006.01)

(52) U.S. Cl.
CPC ............... *H02J 3/00* (2013.01); *H02J 3/381* (2013.01); *H02J 7/0014* (2013.01); *H02J 7/0063* (2013.01); *H02M 7/44* (2013.01); *H02J 7/0065* (2013.01)

(58) Field of Classification Search
None
See application file for complete search history.

(56) References Cited

U.S. PATENT DOCUMENTS

| | | |
|---|---|---|
| 7,471,065 B2 | 12/2008 | Emori et al. |
| 7,524,210 B2 | 4/2009 | Lee et al. |
| 7,859,195 B2 | 12/2010 | Yun |
| 8,575,886 B2 | 11/2013 | Oohara et al. |
| 8,604,730 B2 | 12/2013 | Suzuki |

(Continued)

FOREIGN PATENT DOCUMENTS

| | | |
|---|---|---|
| EP | 2511959 A1 | 10/2012 |
| EP | 2518775 A2 | 10/2012 |

(Continued)

OTHER PUBLICATIONS

Kasper et al., "Scaling and Balancing of Multi-Cell Converters", Power Electronics Conference (IPEC—Hiroshima 2014—ECCE—Asia), 2014 International, pp. 2079-2086, May 2014.

(Continued)

*Primary Examiner* — Jared Fureman
*Assistant Examiner* — Aqeel Bukhari
(74) *Attorney, Agent, or Firm* — Moser Taboada

(57) ABSTRACT

Apparatus for power conversion. In one embodiment, the apparatus comprises a battery unit, coupled to a power line, comprising (a) a plurality of power cells, wherein each power cell of the plurality of power cells comprises a battery cell coupled to a pico-converter, wherein the pico-converter is a bidirectional power converter; and (b) a master controller, coupled to each power cell of the plurality of power cells, for dynamically and individually controlling both an operating state and a power conversion direction for each power cell in the plurality of power cells to generate a predetermined power output from the battery unit.

18 Claims, 4 Drawing Sheets

(56) References Cited

U.S. PATENT DOCUMENTS

| | | |
|---|---|---|
| 8,633,670 B2 | 1/2014 | Choi |
| 8,697,267 B2 | 4/2014 | Colello et al. |
| 8,760,122 B2 | 6/2014 | Demetriades |
| 2004/0145346 A1 | 7/2004 | Hall et al. |
| 2005/0264515 A1 | 12/2005 | Oh et al. |
| 2011/0193528 A1 | 8/2011 | Huggins |
| 2012/0161523 A1 | 6/2012 | Kim et al. |
| 2012/0166013 A1 | 6/2012 | Park et al. |
| 2012/0176094 A1 | 7/2012 | Okuda et al. |
| 2012/0325288 A1 | 12/2012 | Jang et al. |
| 2013/0038289 A1 | 2/2013 | Tse |
| 2013/0193775 A1 | 8/2013 | Lee et al. |
| 2013/0207613 A1 | 8/2013 | Loncarevic |
| 2013/0307479 A1 | 11/2013 | Kim |
| 2013/0342018 A1 | 12/2013 | Moon et al. |
| 2014/0049886 A1 | 2/2014 | Lee et al. |
| 2014/0062383 A1 | 3/2014 | Yun et al. |
| 2014/0097687 A1 | 4/2014 | Park et al. |
| 2014/0227563 A1* | 8/2014 | Colello ............. H01M 8/04679 429/51 |
| 2015/0244190 A1* | 8/2015 | Yamamoto ............ H02J 7/0016 320/126 |

FOREIGN PATENT DOCUMENTS

| | | |
|---|---|---|
| JP | H11341816 A | 12/1999 |
| WO | WO-2008111737 A1 | 9/2008 |
| WO | WO-2011003251 A1 | 1/2011 |
| WO | WO-2012169713 A1 | 12/2012 |

OTHER PUBLICATIONS

International Search Report and Written Opinion dated Feb. 11, 2016 for PCT Application No. PCT/US2015/057083.

* cited by examiner

PARALLEL BATTERY SYSTEM

CROSS-REFERENCE TO RELATED APPLICATION

This application claims priority to U.S. Provisional Patent Application No. 62/068,227, entitled "Massively Parallel AC Battery System" and filed on Oct. 24, 2014, which is herein incorporated in its entirety by reference.

BACKGROUND OF THE INVENTION

Field of the Invention

Embodiments of the present disclosure generally relate to power conversion and, more particularly, to a method and apparatus for paralleling multiple low-power battery cells.

Description of the Related Art

Battery systems are used in a large variety of applications for providing a source of power as well as energy storage. In addition to DC battery systems which provide DC power, there are also AC battery systems which provide AC power.

Conventional AC battery systems provide AC power via one or more DC-AC inverters coupled to the DC output from one or more rechargeable batteries, where each battery is composed of multiple battery cells connected in both series and parallel configurations. Although a battery management system (BMS) may be used for managing such AC battery systems by monitoring operating parameters of the battery system and controlling the battery system operation, such solutions are expensive and these AC battery systems still suffer from issues that result from the topology of the battery cell connectivity. For example, a single battery cell that is degraded may cause result in degraded power output from the battery, or may cause another cell within the battery to overcharge and result in damage to the battery. Additionally, cell mismatch can create safety dangers, such as fires or explosions. Such mismatch is increasingly difficult to manage as the size of the array increases.

Therefore, there is a need in the art for a battery system that can be simply and efficiently managed.

SUMMARY OF THE INVENTION

Embodiments of the present invention generally relate to an apparatus for power conversion as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
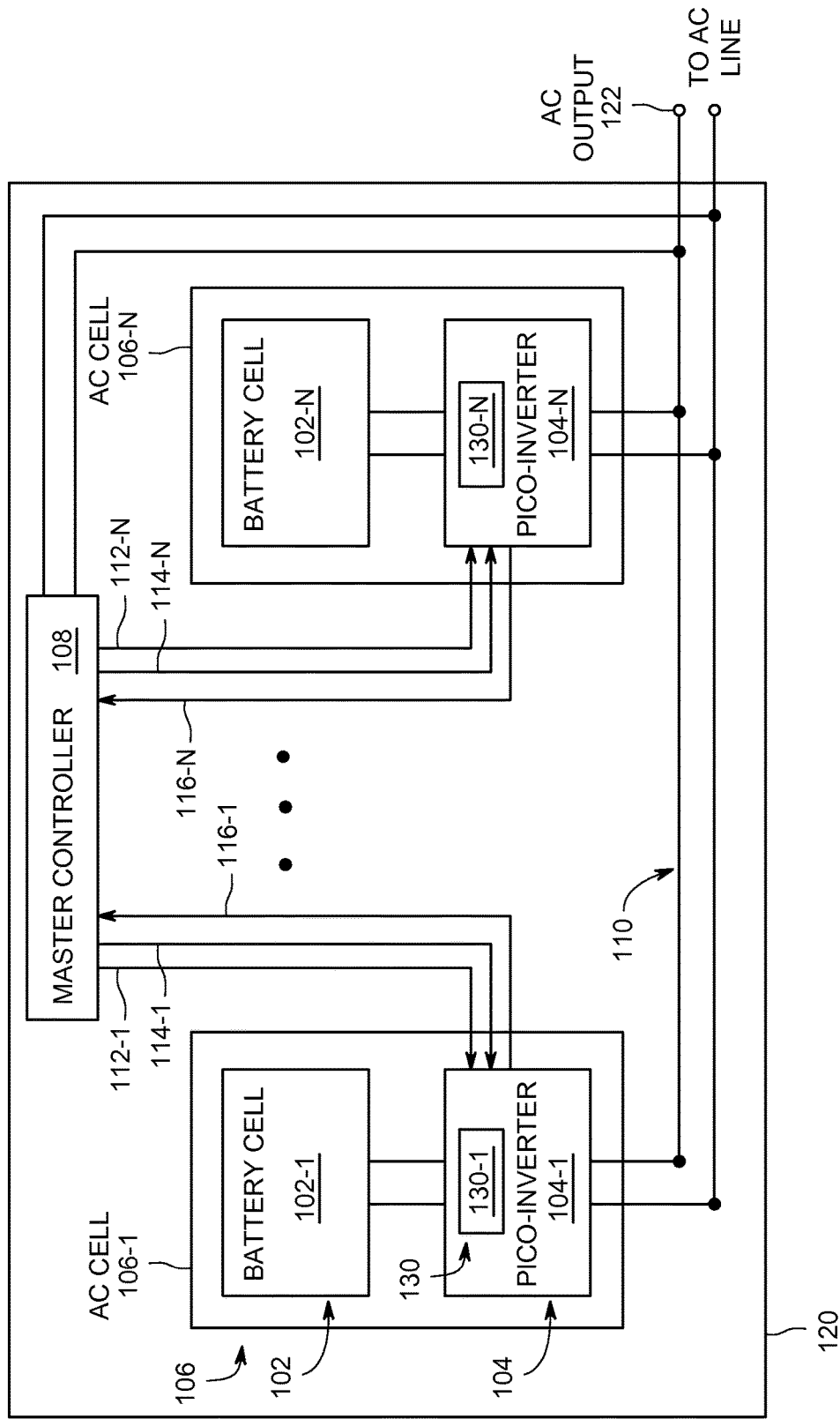
FIG. 1 is a block diagram of a power conversion system in accordance with one or more embodiments of the present invention.

FIG. 1 is a block diagram of a power conversion system 100 in accordance with one or more embodiments of the present invention. The power conversion system 100 comprises an AC battery 120 (which alternately may be referred to as a battery unit 120) comprising a plurality of AC cells 106-1 ... 106-N, collectively referred to as AC cells 106 (which alternately may be referred to as power cells 106). Each AC cell 106 is a low-power (e.g., 3 W) AC cell comprising a battery cell 102 coupled to a pico-inverter 104 (i.e., the AC cell 106-1 comprises a battery cell 102-1 coupled to a pico-inverter 104-1, and the AC cell 106-N comprises a battery cell 102-N coupled to a pico-inverter 104-N). The battery cells 102 are coupled to the pico-inverters 104 such that there is thermal contact between them, and although the embodiment of FIG. 1 depicts a the pico-inverters 104 coupled to the battery cells 102 in a one-by-one correspondence, in other embodiments multiple pico-inverters 104 may be coupled to a single battery cell 102 for providing greater output power from each AC cell 106. The pico-inverters 104 are further coupled to a master controller 108 (e.g., an integrated circuit chip) and also coupled in parallel to an AC bus 110. The AC bus 110 is further coupled at an AC output 122 of the AC battery 120, and the AC output 122 is coupled to an external AC line (e.g., a commercial power grid). In one or more alternative embodiments, the battery unit 120 is a DC battery unit where the power cells 106 are DC power cells, each comprising a DC/DC pico-converter in place of the pico-inverter 104, coupled via a DC bus to a DC output power line; such a structure may be particularly applicable in automotive applications.

The pico-inverters 104-1 through 104-N comprise pico-inverter controllers 130-1 through 130-N, respectively, for communicating with the master controller 108 and operably controlling the pico-inverters 104. Each pico-inverter 104 generally processes a few watts of power (e.g., 3 W, for example 3 volt-1 amp) and is capable of converting DC power from the corresponding battery cell 102 to an AC output power that is coupled to the AC bus 110 (i.e., during a "discharge" period) or converting received AC power from the AC bus 110 to a DC output for charging the corresponding battery cell 102 (i.e., during a "charge" period) as controlled by the master controller 108. In some embodiments, each pico-inverter 104 may be a single-phase DC-AC resonant inverter having a transformer that may be regular magnetics and/or a piezoelectric transformer, although in other embodiments the pico-inverters 104 may be other types of inverters. Examples of pico-inverters 104 may be found in co-pending commonly assigned U.S. patent application Ser. No. 62/044,116, entitled "Massively Parallel Power Converter" and filed Aug. 29, 2014, which is herein incorporated in its entirety by reference. In some embodiments, each battery cell 102 may be an 18650 Li-Ion cell.

Each of the pico-inverters 104 is coupled to the master controller 108 via two master controller control inputs 112 and 114—i.e., the pico-inverter 104-1 is coupled to the master controller 108 via the control inputs 112-1 and 114-1 for receiving control instructions from the master controller 108, and the pico-inverter 104-N is coupled to the master controller 108 via the control inputs 112-N and 114-N for receiving control instructions from the master controller 108. The first control input 112 receives an operating state signal for either activating power conversion by the pico-inverter 104 (i.e., an "ON" signal) or deactivating the power conversion (i.e., an "OFF") signal. The second control input 114 receives a power direction signal for driving the pico-inverter 104 to discharge the corresponding battery cell 102 during a discharge period to generate AC output power or to charge the corresponding battery cell during a charge period. Such control signals are used to operate each pico-inverter 104 to process a nominal amount of power at a given time; for example, power conversion by a pico-inverter 104 can be enabled on a microsecond basis by the operating state signal (ON/OFF) while the power direction signal (charge/discharge) controls the direction of energy flow. In some other embodiments, each pico-inverter 104 may have fewer or more control inputs. In one or more embodiments, the pico-converters 104 and the master controller 108 may be coupled to one another via a bus for control and feedback communications.

Each of the pico-inverters 104 is also coupled to the master controller 108 via a feedback output 116—i.e., the pico-inverters 104-1 and 104-N are coupled to the master controller 108 via the feedback outputs 116-1 and 116-N, respectively—for providing a feedback signal (e.g., a 6-bit digital signal, although the signal may have fewer or more bits) to the master controller 108. Such feedback signals may include state of health (SOH) and/or state of charge (SOC) for the battery cell 102; power information indicating the amount of power being processed by the pico-inverter 104 (e.g., output power from the pico-inverter 104 may be measured, or DC input current to the pico-inverter 104 may be measured as a proxy for the amount of power processed); temperature information (e.g., operating temperature of the battery cell 102 and/or the pico-inverter 104); fault information (e.g., an overtemperature indication); or other information related to other operating conditions for the AC cell 106. The master controller 108 uses the feedback signals to ensure that the total instantaneous energy is correct.

The master controller 108 issues both operating state signals (i.e., "ON" and "OFF") and power direction signals (i.e., for charging or discharging) to each of the pico-inverters 104 for controlling operation of the AC battery system 120. The master controller 108 issues such control signals for each AC cell 106 in real-time, for example on the order of every tens of microseconds. Using the feedback signals received from the pico-inverters 104, the master controller 108 coordinates the operation of each AC cell 106 and issues the corresponding control signals to each pico-inverter 104 for controlling which AC cells 106 are active (i.e., "ON") or inactive (i.e., "OFF") at any given time and the direction of power flow through each of the active AC cells 106. As such, the master controller 108 controls which AC cells 106 are operated at a given time (from none to all) and therefore manages the AC battery 120 on a cell-by-cell basis. For example, some pico-inverters 104 may be activated (i.e., ON) for a relatively "long" period of time such as a few milliseconds, while other pico-inverters 104 may be activated for much shorter periods of times within a grid cycle. The master controller 108 synthesizes the desired grid current waveform (i.e., a grid-compliant current waveform0 from the plurality of resources, each of which has a tertiary control (OFF, charge, discharge) at the microsecond level; each pico-inverter 104 is operated at its best operating point, typically for highest efficiency. In one or more other embodiments, the master controller 108 controls the AC battery system 120 to synthesize other types of waveforms, such as non-sinusoidal waveforms. For example, the master controller 108 may control the AC battery system 120 such that the current is adjusted in real time so that the output voltage is sinusoidal (e.g., for use in off-grid systems).

During charging periods of the AC battery 120, the master controller 108 may control each of the pico-inverters 104 to fully charge the AC battery 120 such that each of the battery cells 102 is fully charged. The master controller 108 may use one or more charging techniques (such as constant current, constant voltage, pulsed charge, or the like) as well as control the rate of charge for each of the battery cells 102 until fully charged; in most AC applications, the charging is by definition pulsed in nature and the current will have to be stopped twice per grid cycle at a minimum (however, during the amount of times where the current is applied, it can be constant).

During discharge periods of the AC battery 120, the master controller 108 controls the discharge AC cells 106 according to the need for the AC power flow. In some embodiments, rather than generating a pure sine-wave output from each active AC cell 106, the master controller 108 controls each active AC cell 106 (i.e., each active pico-inverter 104) to generate current on a binary basis with a sign bit. At each point in time, the AC output power from the AC battery 120 is equal to the sum of discrete units of power output from each active AC cell 106. As such, the amount of power (i.e., the magnitude, phase, and frequency for AC output power) from the AC battery 120 can by controlled by changing the number of AC cells 106 that are charging, discharging, or inactive at a given time. In some embodiments, each active AC cell 106 may be controlled to generate equal discrete power outputs; alternatively, the different active AC cells 106 may generate different levels of output power or other techniques may be used to obtain the desired output from the AC battery 120. The master controller 108 may further control each of the AC cells 106 such that charging and discharging are spread across different cells over time.

The master controller 108 may control the operation of the AC cells 106 for efficient current management, thermal management, and/or electromagnetic compatibility (EMC). For example, the master controller 108 may operate the AC cells 106 to spread current as well as thermal losses over a large array of the cells, and spurs can be spread over a large frequency band.

Although the AC battery 120 depicted in FIG. 1 generates a single-phase AC output, in other embodiments the AC battery 120 may generate split-phase AC power, two-phase AC power, or three-phase AC power. In one or more embodiments where the AC battery 120 generates split-phase AC power, the outputs from a first group of AC cells 106 may be coupled to a first conductor line and a neutral line of an AC line, and the outputs from a second group of AC cells 106 may be coupled to a second conductor line and the neutral line of the AC line. The first and second groups of AC cells 106 are then each controlled such that the output power from the AC battery 120 is split-phase AC power.

In one or more embodiments where the AC battery 120 generates two-phase AC power, the outputs from a first group of AC cells 106 are coupled to a first pair of AC lines, and the outputs from a second group of AC cells 106 are coupled to a second pair of AC lines. The first and second groups of AC cells 106 are then each controlled such that the output power from the AC battery 120 is a balanced two-phase AC output power. In one or more embodiments where the AC battery 120 generates three-phase AC power, the from each of a first, a second, and a third group of AC cells 106 are coupled to a first, a second, and a third pair of AC lines, respectively. The three groups of AC cells 106 are then each controlled such that the output power from the AC battery 120 is a balanced three-phase AC output power.

The AC battery 120 may comprise tens to hundreds of AC cells 106, although the AC cells 106 are infinitely parallelable for providing from a few watts to very large arrays to provide much greater output power. Generally, the AC battery 120 comprises a large number of AC cells 106 to avoid harmonic distortion at the AC output 122. In order to meet distortion requirements of 3% total harmonic distortion (THD), the AC battery 120 may comprise on the order of one hundred AC cells 106; for less stringent requirements, tens of AC cells 106 would be adequate. In some embodiments, groups of parallel-connected AC cells 106 may be serially coupled to one another for providing a larger output voltage at the AC output 122.

The total number of AC cells 106 employed, as well as the number of AC batteries 120, is additionally based on total output power desired; for example, for a desired output power of 100 kW, tens of thousands of AC cells 106 would be employed overall in parallel combinations of thousands of AC batteries 120.

As a result of its distributed topology, the AC battery 120 is highly redundant and fault tolerant. For example, the AC battery 120 is tolerant of cell mismatches, and the safety of each AC cell 106 can be individually evaluated by the master controller 108 based on received feedback signals. AC cells 106 that are determined to be degrading can be kept off by the master controller 108 or used only to their capacity. Additionally, each AC cell 106 may comprise an isolation device, such as a fuse or a fusible link, to completely isolate the AC cell 106 during a failure of the AC cell 106.

The master controller 108 may be coupled to the AC bus 110 for receiving an AC line reference signal (for determining frequency and phase of an AC signal on the AC line) and for performing grid interconnection functions such as voltage and frequency checks, anti-islanding, and the like. In some embodiments, the master controller 108 may use power line communications for communicating over the AC line with one or more external devices (e.g., for receiving instructions from and/or communicating data to one or more external devices); additionally or alternatively, the master controller 108 may use other types or wired and/or wireless techniques for such communication. The AC bus 110 may be a single-phase, split-phase, two-phase, or three-phase bus depending upon the application.

One example of the pico-inverters 104 and the master controller 108 may be found in commonly assigned, co-pending U.S. patent application Ser. No. 14/841,010, entitled "Parallel Power Converter", filed Aug. 31, 2015, which is herein incorporated in its entirety by reference. In some embodiments, the pico-inverters 104 and the master controller 108 described herein may correspond to the power bricks 100 and the master controller 208 described in U.S. patent application Ser. No. 14/841,010.

Figure 2:
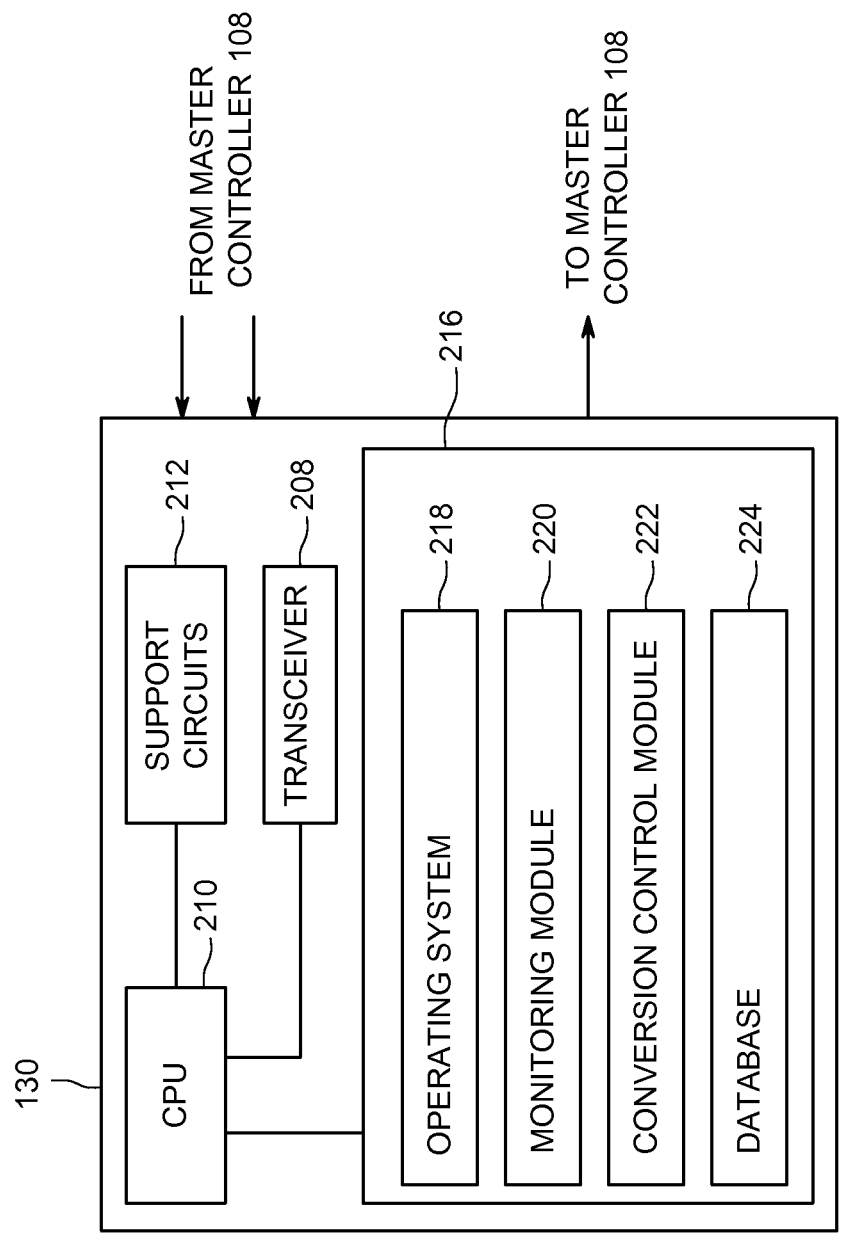
FIG. 2 is a functional block diagram of a pico-inverter controller in accordance with one or more embodiments of the present invention.

FIG. 2 is a functional block diagram of a pico-inverter controller 130 in accordance with one or more embodiments of the present invention. The pico-inverter controller 130 comprises at least one central processing unit (CPU) 210 coupled to each of a transceiver 208, support circuits 212, and a memory 216. The CPU 210 may comprise one or more processors, microprocessors, microcontrollers and combinations thereof configured to execute non-transient software instructions to perform various tasks in accordance with the present invention. In some embodiments, the CPU 210 may be a microcontroller comprising internal memory for storing controller firmware that, when executed, provides the controller functionality described herein. The CPU 210 may additionally or alternatively include one or more application specific integrated circuits (ASICs).

The transceiver 208 is communicatively coupled to the master controller 108 (e.g., via a bus) for transmitting feedback to the master controller 108 and receiving control instructions from the master controller 108 as described herein.

The support circuits 212 are well known circuits used to promote functionality of the CPU 210. Such circuits include, but are not limited to, a cache, power supplies, clock circuits, buses, network cards, input/output (I/O) circuits, and the like. The pico-inverter controller 130 may be implemented using a general purpose computer that, when executing particular software, becomes a specific purpose computer for performing various embodiments of the present invention.

The memory 216 may comprise random access memory, read only memory, removable disk memory, flash memory, and various combinations of these types of memory. The memory 216 is sometimes referred to as main memory and may, in part, be used as cache memory or buffer memory. The memory 216 generally stores the operating system (OS) 218 of the pico-inverter controller 130. The OS 218 may be one of a number of commercially available operating systems such as, but not limited to, Linux, Real-Time Operating System (RTOS), and the like.

The memory 216 stores non-transient processor-executable instructions and/or data that may be executed by and/or used by the CPU 210. These processor-executable instructions may comprise firmware, software, and the like, or some combination thereof.

The memory 216 stores various forms of application software, such as a monitoring module 220 for monitoring one or more operating parameters of the AC cell 106, including pico-inverter parameters (e.g., power, current, voltage, frequency, temperature, and the like) and battery cell parameters (e.g., state of health (SOH), state of charge (SOC), operating temperature, fault indications such as overtemperature indication, and the like), which may then be communicated to the master controller 108 via the feedback output 116. The memory 216 further stores a conversion control module 222 for controlling the power conversion performed by the pico-inverter 104 based on the received control signals from the master controller 108. The memory 216 may further store a database 224 for storing various data, such as one or more monitored parameters and/or control instructions.

Figure 3:
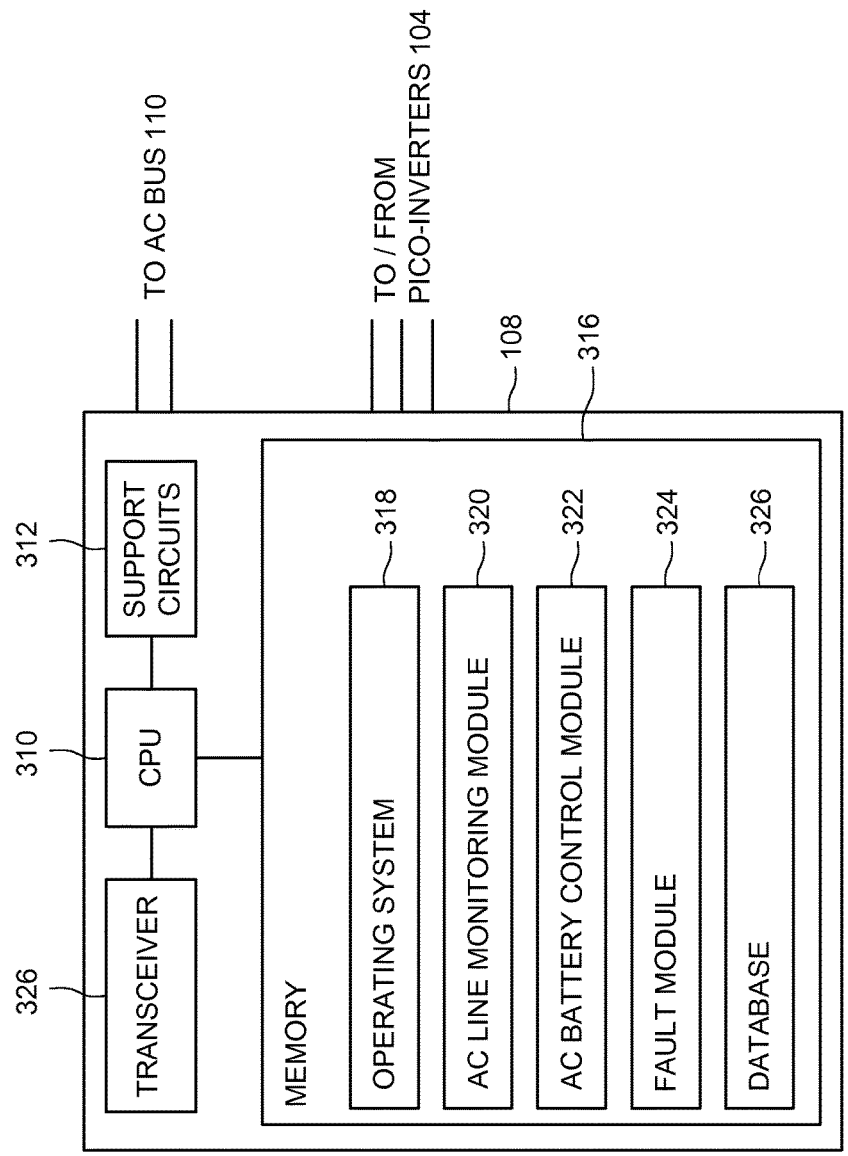
FIG. 3 is a functional block diagram of a master controller in accordance with one or more embodiments of the present invention.

FIG. 3 is a functional block diagram of a master controller 108 in accordance with one or more embodiments of the present invention. The master controller 108 comprises at least one central processing unit (CPU) 310 coupled to each of a transceiver 326, support circuits 312 and to a memory 316. The CPU 310 may comprise one or more processors, microprocessors, microcontrollers and combinations thereof configured to execute non-transient software instructions to perform various tasks in accordance with the present invention. In some embodiments, the CPU 310 may be a microcontroller comprising internal memory for storing controller firmware that, when executed, provides the controller functionality described herein. The CPU 310 may additionally or alternatively include one or more application specific integrated circuits (ASICs).

The transceiver 326 is communicatively coupled to the pico-inverters 104 (e.g., via a bus) for receiving feedback from the pico-inverters 104 and transmitting control instructions to the pico-inverters 104 as described herein.

In some embodiments, the master controller 108 may further comprise an external communications transceiver (not shown) coupled to the AC bus 110 for communicating to one or more external devices over AC power lines using power line communications. Such an external communications transceiver may additionally or alternatively utilize wireless (e.g., based on standards such as IEEE 802.11, Zigbee, Z-wave, or the like) and/or other types of wired communication techniques for external communications.

The support circuits 312 are well known circuits used to promote functionality of the CPU 310. Such circuits include, but are not limited to, a cache, power supplies, clock circuits, buses, network cards, input/output (I/O) circuits, and the like. The master controller 108 may be implemented using a general purpose computer that, when executing particular software, becomes a specific purpose computer for performing various embodiments of the present invention.

The memory 316 may comprise random access memory, read only memory, removable disk memory, flash memory, and various combinations of these types of memory. The memory 316 is sometimes referred to as main memory and may, in part, be used as cache memory or buffer memory. The memory 316 generally stores the operating system (OS) 318 of the master controller 108. The operating system 318 may be one of a number of commercially available operating systems such as, but not limited to, Linux, Real-Time Operating System (RTOS), and the like.

The memory 316 stores non-transient processor-executable instructions and/or data that may be executed by and/or used by the CPU 310. These processor-executable instructions may comprise firmware, software, and the like, or some combination thereof.

The memory 316 stores various forms of application software, such as an AC line monitoring module for monitoring an AC signal on the AC line (e.g., for determining frequency and phase information of the AC signal), and an AC battery control module 322 for coordinating operation of the AC cells 106 to achieve the desired output power from the AC battery 120 (e.g., determining an operating state ("ON" or "OFF") and a charge/discharge state for each AC cell 106 and generating the appropriate control signals for each pico-inverter 104, where the granularity of such control signals may be on the order of tens of microseconds, such as 10-100 psec). The memory 316 may further store a fault module 324 for monitoring each AC cell 106 for fault indications and generating suitable control signals in response to any faults, and a database 326 for storing various data related to the operation of one or more of the AC cells 106 and/or the AC battery 120.

Figure 4:
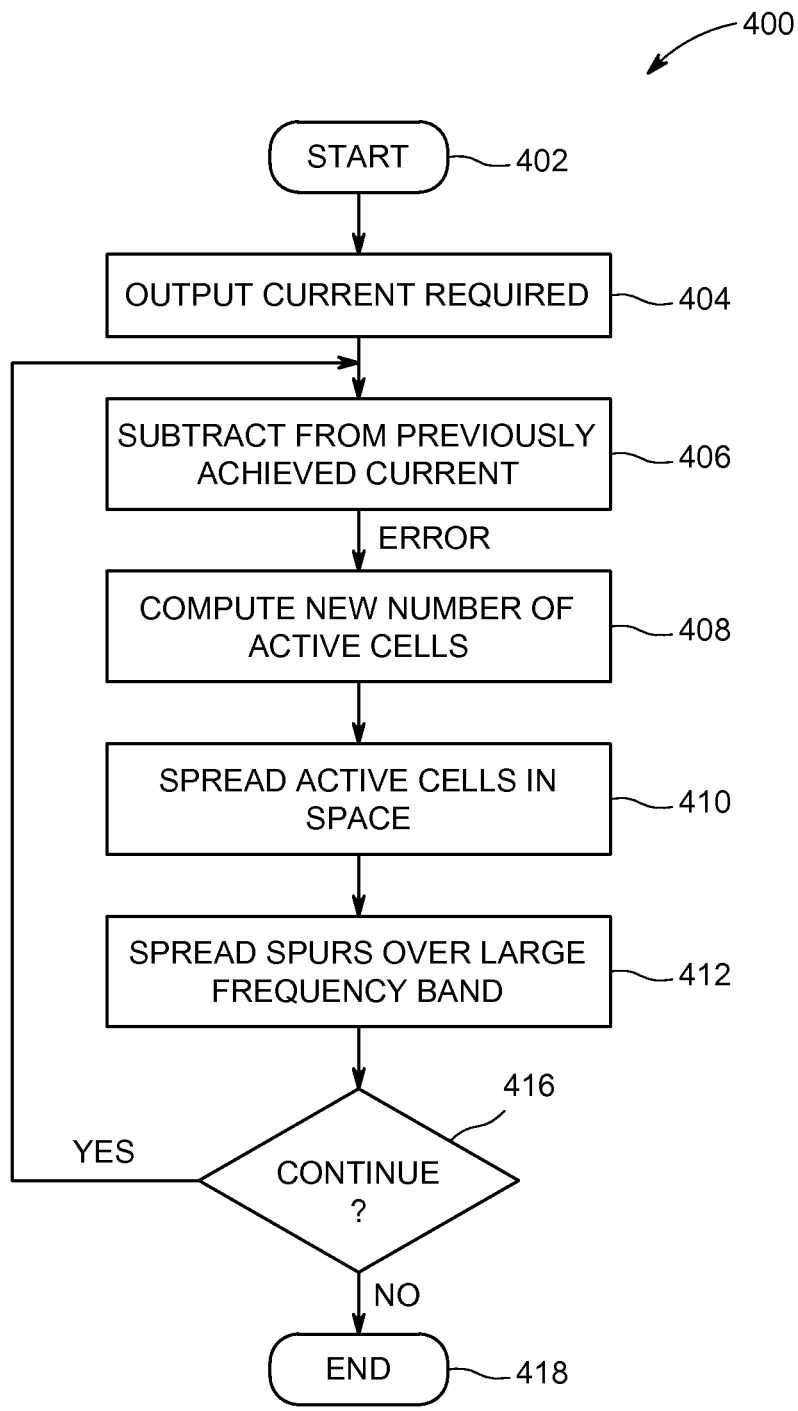
FIG. 4 is a flow diagram of a method for controlling an AC battery in accordance with one or more embodiments of the present invention.

FIG. 4 is a flow diagram of a method 400 for controlling an AC battery 120 in accordance with one or more embodiments of the present invention. In one embodiment, the method 400 is an implementation of one or more of the AC line monitoring module 320, the AC battery control module 322, and the fault module 324.

The method 400 starts at step 402 and proceeds to step 404, where the output current required from the AC battery 120 is determined. At step 406, the required output current is subtracted from the previously achieved current to determine an error amount. At step 408, a new number of active AC cells 106 is computed based on the error amount. At step 410, the active AC cells 106 are spread in space for current and thermal management. At step 412, the spurs are spread over a large frequency band. At step 416, it is determined whether to continue; if yes the method 400 returns to step 406, if no then the method 400 proceeds to step 418 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. Apparatus for power conversion, comprising:
a battery unit, coupled to a power line, comprising:
a plurality of power cells coupled in parallel, wherein each power cell of the plurality of power cells comprises a battery cell coupled to a pico-converter, wherein the pico-converter is a bidirectional power converter; and
a master controller, coupled to each power cell of the plurality of power cells, for dynamically and individually controlling both an operating state and a power conversion direction for each power cell in the plurality of power cells to generate a predetermined power output from the battery unit, wherein each pico-converter of the plurality of power cells is a bidirectional DC-AC inverter, the power line is an AC power line, and the predetermined power output is an AC power output.

2. The apparatus of claim 1, wherein each power cell of the plurality of power cells comprises (i) a first input, coupled to the master controller, for receiving an operating state control signal from the master controller indicating the operating state, (ii) a second input, coupled to the master controller, for receiving a power conversion direction control signal indicating the power conversion direction, and (iii) a feedback output, coupled to the master controller, for providing a feedback signal to the master controller.

3. The apparatus of claim 2, wherein the master controller issues both the operating state control signal and the power conversion direction control signal in real-time for each power cell in the plurality of power cells based on the feedback signal received from each power cell in the plurality of power cells.

4. The apparatus of claim 1, wherein the operating state is either active or inactive.

5. The apparatus of claim 1, wherein the master controller controls each power cell in the plurality of power cells to spread current and thermal losses over the plurality of power cells.

6. The apparatus of claim 1, wherein, for each power cell of the plurality of power cells, controlling the power conversion direction comprises controlling the pico-converter to either charge the battery cell or discharge the battery cell.

7. The apparatus of claim 1, wherein the master controller controls at least one power cell of the plurality of power cells to fully charge the corresponding battery cell.

8. The apparatus of claim 1, wherein the master controller controls each power cell in the plurality of power cells to synthesize a grid-compliant current waveform at the output of the battery unit.

9. The apparatus of claim 1, wherein the master controller individually controls each active power cell in the plurality of power cells to generate a discrete amount of output power such that the sum of the output power from each active power cell in the plurality of power cells is equal to the AC power output.

10. The apparatus of claim 9, wherein the discrete amount of the output power from each active power cell in the plurality of power cells is the same.

11. The apparatus of claim 9, wherein the discrete amount of the output power from each active power cell in the plurality of power cells is not the same.

12. The apparatus of claim 2, wherein the master controller issues both the operating state control signal and the power conversion direction control signal in real-time for each power cell in the plurality of power cells based on (i) the feedback signal received from each power cell in the plurality of power cells, and (ii) an AC line reference signal from the AC power line.

13. The apparatus claim 1, wherein each pico-converter of the plurality of power cells is a single-phase DC-AC inverter.

14. The apparatus of claim 13, wherein a first group of power cells of the plurality of power cells is coupled to a first conductor line of the power line, a second group of power cells of the plurality of power cells is coupled to a second conductor line of the power line, and the master controller controls the plurality of power cells to generate a split-phase AC output from the battery unit.

15. The apparatus of claim 13, wherein a first group of power cells of the plurality of power cells is coupled to a first conductor line of the power line, a second group of power cells of the plurality of power cells is coupled to a second conductor line of the power line, a third group of power cells of the plurality of power cells is coupled to a third conductor line of the power line, and the master controller controls the plurality of power cells to generate a three-phase AC output from the battery unit.

16. The apparatus of claim 13, wherein the pico-converter of the plurality of power cells is a resonant converter comprising a piezoelectric transformer.

17. The apparatus of claim 1, wherein each pico-converter of the plurality of power cells processes on the order of 3 W of power.

18. The apparatus of claim 1, wherein the master controller uses power line communications for communicating via the power line.

* * * * *